US012695090B2

(12) United States Patent
Wu

(10) Patent No.: US 12,695,090 B2
(45) Date of Patent: Jul. 28, 2026

(54) POSITIVE ACTIVE MATERIAL AND ELECTROCHEMICAL DEVICE

(71) Applicant: Ningde Amperex Technology Limited, Ningde City (CN)

(72) Inventor: Xia Wu, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 642 days.

(21) Appl. No.: 18/129,440

(22) Filed: Mar. 31, 2023

(65) Prior Publication Data

US 2023/0238529 A1 Jul. 27, 2023

Related U.S. Application Data

(63) Continuation of application No. PCT/CN2021/128709, filed on Nov. 4, 2021.

(30) Foreign Application Priority Data

Nov. 10, 2020 (CN) ......................... 202011243565.4

(51) Int. Cl.
| | |
|---|---|
| *H01M 4/525* | (2010.01) |
| *H01M 10/0525* | (2010.01) |
| *H01M 4/02* | (2006.01) |

(52) U.S. Cl.
CPC ....... *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,048,564 | B2 | 11/2011 | Saito et al. |
| 10,340,513 | B2 | 7/2019 | Sugiura |
| 11,031,595 | B2 | 6/2021 | Hur et al. |
| 2010/0173202 | A1 | 7/2010 | Saito et al. |
| 2012/0034516 | A1 | 2/2012 | Koo et al. |
| 2014/0079990 | A1 | 3/2014 | Yanagida et al. |
| 2015/0132666 | A1 | 5/2015 | Ogata et al. |
| 2016/0028080 | A1 | 1/2016 | Sugiura |
| 2016/0351901 | A1 | 12/2016 | Saito |
| 2018/0145317 | A1 | 5/2018 | Momma et al. |
| 2019/0221828 | A1 | 7/2019 | Hiratsuka |

| | | | |
|---|---|---|---|
| 2019/0252680 | A1 | 8/2019 | Ando et al. |
| 2020/0020946 | A1 | 1/2020 | Hur et al. |
| 2020/0176772 | A1 | 6/2020 | Yamamoto et al. |

FOREIGN PATENT DOCUMENTS

| | | |
|---|---|---|
| CN | 101573813 A | 11/2009 |
| CN | 101689631 A | 3/2010 |
| CN | 103094523 A | 5/2013 |
| CN | 105280911 A | 1/2016 |
| CN | 105940534 A | 9/2016 |
| CN | 105990577 A | 10/2016 |
| CN | 110323432 A | 10/2019 |
| CN | 110366791 A | 10/2019 |
| CN | 111224090 A | 6/2020 |
| CN | 112331841 A | 2/2021 |
| JP | 2000-128539 A | 5/2000 |
| JP | 2012-508444 A | 4/2012 |
| JP | 2016-25010 A | 2/2016 |
| JP | 2018-18789 A | 2/2018 |
| JP | 2020-087810 A | 6/2020 |
| JP | 2020-115461 A | 7/2020 |
| WO | 2012/165207 A1 | 12/2012 |
| WO | 2014/083848 A1 | 6/2014 |
| WO | 2015/115025 A1 | 8/2015 |
| WO | 2018/061298 A1 | 4/2018 |

OTHER PUBLICATIONS

Office Action dated Jan. 7, 2022, issued in counterpart CN Application No. 202011243565.4. (5 pages).
Office Action dated May 10, 2022, issued in counterpart CN Application No. 202011243565.4. (4 pages).
Office Action dated Apr. 25, 2023, issued in counterpart JP application No. 2022-522741, with English translation. (12 pages).
Office Action dated Oct. 17, 2023, issued in counterpart JP application No. 2022-522741, with English translation. (4 pages).
Office Action dated Jul. 6, 2021, issued in counterpart CN Application No. 202011243565.4. (7 pages).
International Search Report dated Jan. 28, 2022, issued in counterpart Application No. PCT/CN2021/128709. (4 pages).
Extended (Supplementary) European Search Report dated Feb. 12, 2024, issued in counterpart EP Application No. 21891033.9. (4 pages).

*Primary Examiner* — Carlos Barcena
(74) *Attorney, Agent, or Firm* — WHDA, LLP

(57) ABSTRACT

A positive active material, comprising a lithium transition metal composite oxide containing Co and R elements and an M element. The lithium transition metal composite oxide has a $P6_3mc$ crystal structure. The M element includes at least one of Al, Mg, Ti, Mn, Fe, Ni, Zn, Cu, Nb, Cr, Y, or Zr. The R element includes at least one of F or Cl. A molar content of the R element is $n_R$, a sum of a molar content of the Co element and a molar content of the M element is $n_{Co+M}$, and a ratio δ of $n_R$ to $n_{Co+M}$ is $0 < δ ≤ 0.01$. The crystal structure of the positive active material according to this application is highly stable, thereby improving cycle performance and thermal stability of the electrochemical device.

20 Claims, 1 Drawing Sheet

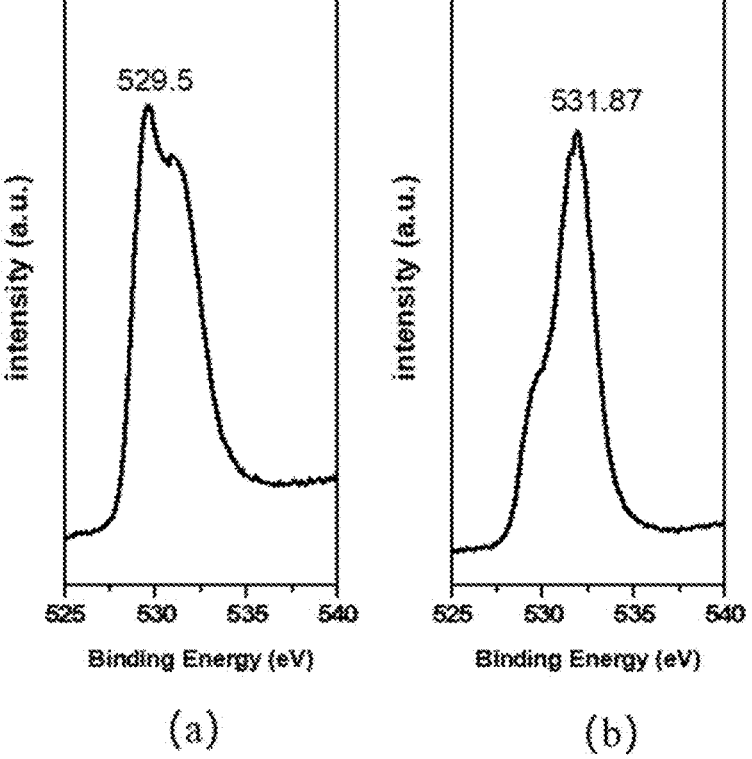
(a)                              (b)

POSITIVE ACTIVE MATERIAL AND ELECTROCHEMICAL DEVICE

CROSS-REFERENCE TO RELATED APPLICATIONS

This application is a continuation application of PCT international application No. PCT/CN2021/128709, filed on Nov. 4, 2021 and entitled "POSITIVE ACTIVE MATERIAL AND ELECTROCHEMICAL DEVICE", which claims priority to Chinese Patent Application No. 202011243565.4, filed with the Chinese Patent Office on Nov. 10, 2020 and entitled "POSITIVE ACTIVE MATERIAL AND ELECTROCHEMICAL DEVICE", which is incorporated herein by reference in its entirety.

TECHNICAL FIELD

This application relates to the technical field of positive electrode materials, and in particular, to a positive active material and an electrochemical device.

BACKGROUND

Lithium-ion batteries are widely used in the fields such as portable electronic products, electric transportation, national defense aviation, and energy storage by virtue of a high energy density, high cycle performance, environment-friendliness, safety, and no memory effect. To meet the requirements of social development, seeking a lithium-ion battery of a higher energy density and a higher power density is an urgent issue to be addressed. This requires that the positive electrode material in use to have a higher specific capacity and a higher voltage plateau.

To achieve higher specific energy, the positive active material is developing toward high voltage. With the increase of voltage, a large amount of $Li^+$ is deintercalated from the positive active material. The crystal structure of the material undergoes a series of irreversible phase transitions ($O_3$ to $H_{1-3}$, $H_{1-3}$ to $O_1$), thereby impairing the cycle performance and safety performance of the material significantly. In addition, interfacial side reactions increase under a high voltage. For example, the cobalt metal of the $LiCoO_2$ material is dissolved out severely. However, a high-voltage electrolytic solution technology is hardly adaptable, a conventional electrolytic solution under a high voltage decomposes and fails more quickly, thereby leading to drastic capacity attenuation. To improve the stability of the crystal phase structure of the material, the irreversible phase transition can be postponed by doping with metal cations. However, this method brings insignificant effects on structural stability under the voltage higher than 4.6 V. In addition, the loss of theoretical capacity increases with the increase of the amount of doping.

Therefore, it is urgent to find a positive active material characterized by a high specific capacity, a high voltage plateau, high structural reversibility, and a stable interface under a high voltage.

SUMMARY

In view of the fact above, this application discloses a positive active material and an electrochemical device. The material has a $P6_3mc$ crystal structure that is stable, and has an HCP oxygen structure characterized by low oxygen activity under a high voltage, so as to improve the capacity and cycle stability of a lithium-ion battery.

According to a first aspect, this application provides a positive active material. The positive active material has a $P6_3mc$ crystal structure. The positive active material is a lithium transition metal composite oxide containing Co and R elements and optionally containing an M element. The M element includes at least one of Al, Mg, Ti, Mn, Fe, Ni, Zn, Cu, Nb, Cr, Y, or Zr. The R element includes at least one of F or Cl. A molar content of the R element is $n_R$, a sum of a molar content of the Co element and a molar content of the M element is $n_{Co+M}$, and a ratio of $n_R$ to $n_{Co+M}$ is $0 < \delta \leq 0.01$.

According to a second aspect, this application provides an electrochemical device, including a positive active material layer. The positive active material layer includes a positive active material according to the first aspect of this application. A compacted density of the positive active material layer is 3.0 $g/cm^3$ to 4.4 $g/cm^3$, and preferably, 4.12 $g/cm^3$ to 4.22 $g/cm^3$.

Compared with the prior art, this application achieves at least the following beneficial effects:

The positive active material according to this application has a $P6_3mc$ crystal structure that is highly stable, so that the probability of particles breaking and the crystal structure disruption is reduced, and the cycle performance and thermal stability of the electrochemical device are improved.

The positive active material according to this application is co-doped with anions and cations. The Co and M elements are used as cations, and the R element is used as an anion. M and O form an M-O bond. The M-O bond and the anion R lower an energy band structure of oxygen, thereby reducing the energy band overlap between Co and oxygen, and slowing down a crystal lattice from releasing oxygen. This can stabilize the oxygen in the positive active material, so that the specific capacity and the voltage plateau of the positive active material are relatively high. This also helps to reduce interface side reactions of the positive active material under a high voltage and improve interface stability.

Therefore, the electrochemical device according to this application also has a high specific capacity, a high voltage plateau, and an interface that is stable under a high voltage, and can improve cycle stability.

BRIEF DESCRIPTION OF DRAWINGS

Part (a) of the FIGURE is an XPS spectrum of a positive active material according to Comparative Embodiment 1, and part (b) of the FIGURE is an XPS spectrum of a positive active material according to Embodiment 3.

DETAILED DESCRIPTION

Exemplary embodiments of this application are described below. It needs to be noted that various improvements and refinements, which may be made by a person of ordinary skill in the art without departing from the principles of the embodiments of this application, fall within the protection scope of this application.

For brevity, merely a part of numerical ranges are explicitly disclosed herein. However, any lower limit may be combined with any upper limit to form an unspecified range, any lower limit may be combined with any other lower limit to form an unspecified range, and any upper limit may be combined with any other upper limit to form an unspecified range. In addition, although not explicitly stated, any point and any single numerical value between end points of a range are included in the range. Therefore, each point or each single numerical value may be used as a lower limit or upper limit of the range to combine with any other point or other single numerical value or with any other lower or upper limit to form an unspecified range.

It needs to be noted that in the description herein, unless otherwise specified, a range defined by a numerical value qualified by "at least" or "at most" includes this numerical value, and the word "more" in the phrase "one or more of" means at least two.

The above summary of this application is not intended to describe every disclosed embodiment or every implementation of this application. The following description exemplifies illustrative embodiments in more detail. In several places throughout this application, guidance is provided through a series of embodiments. Embodiments may be used in various combinations. In each instance, an enumerated list serves merely as a representative list, but is not to be construed as an exclusive list.

Positive Active Material

Firstly, a positive active material according to a first aspect of this application is described below. The positive active material has a $P6_3mc$ crystal structure. The positive active material is a lithium transition metal composite oxide containing Co and R elements and optionally containing an M element. The M element includes at least one of Al, Mg, Ti, Mn, Fe, Ni, Zn, Cu, Nb, Cr, Y, or Zr. The R element includes at least one of F or Cl. A molar content of the R element is $n_R$, a sum of a molar content of the Co element and a molar content of the M element is $n_{Co+M}$, and a ratio of $n_R$ to $n_{Co+M}$ is $0 < \delta \leq 0.01$.

The positive active material according to this application has a $P6_3mc$ crystal structure, and specifically, a hexagonal close-packed crystal structure. The stability of the crystal structure is higher, the probability of particles breaking and the crystal structure disruption is lower, and the structural change caused by deintercalation and intercalation of lithium ions is smaller. In addition, the crystal structure is more stable in air and water, thereby helping to improve the cycle performance and thermal stability of the lithium-ion battery.

The positive active material according to this application is co-doped with anions and cations. The Co and M elements are used as cations, and the R element is used as an anion. The M-O bond and the anion R lower the energy band structure of oxygen, thereby reducing the energy band overlap between Co and oxygen, and slowing down the crystal lattice from releasing oxygen. This can stabilize the oxygen in the positive active material during cycles of the battery and stabilize the interface between the positive active material and the electrolytic solution to improve cycle stability, so that the specific capacity and the voltage plateau of the positive active material are relatively high. This also helps to reduce interface side reactions of the positive active material under a high voltage and improve interface stability. The specific method of co-doping with anions and cations is not limited. Wet doping may be performed in a precursor co-precipitation stage, or dry doping may be performed in a sintering stage.

Preferably, the cationic doping element M includes at least one of Al, Mg, Ti, Mn, or Y. The anionic doping element R includes at least one of F or Cl, and more preferably, includes F. F makes the structure of the positive active material more stable, stabilizes the interface between the positive active material and the electrolytic solution during cycles of the battery, and helps to improve the cycle performance of the lithium-ion battery.

Preferably, the molar content of the M element is $n_M$, a ratio of $n_M$ to $n_{Co+M}$ is $0 \leq y < 0.15$, the molar content of the Co element is $n_{Co}$, and the ratio of $n_{Co}$ to $n_{Co+M}$ is $1-y$.

In some embodiments of this application, the positive active material further includes a Li element. The molar content of the Li element is $n_{Li}$, and the ratio of $n_{Li}$ to $n_{Co+M}$ is $0.6 < x < 0.95$.

In some embodiments of this application, the positive active material further includes an Na element. The molar content of the Na element is $n_{Na}$, and the ratio of $n_{Na}$ to $n_{Co+M}$ is $0 < z < 0.03$.

In a specific embodiment of this application, a chemical general formula of the positive active material is $Li_xNa_zCo_{1-y}M_yO_{2-\delta}R_\delta$, where $0.6 < x < 0.95$, $0 \leq y < 0.15$, $0 \leq z < 0.03$, and $0 < \delta \leq 0.01$.

As analyzed using X-ray photoelectron spectroscopy, an XPS spectrum of the positive active material contains an O1s peak in a range of 530 eV to 535 eV. As shown in the FIGURE, in the XPS spectrum, an O characteristic peak moves toward high binding energy, thereby reducing the energy band overlap between Co and O, slowing down the crystal lattice from releasing oxygen, stabilizing the oxygen in the positive active material, thereby stabilizing the interface between the positive active material and the electrolytic solution, and improving the cycle stability.

In some embodiments of this application, the positive active material includes but is not limited to: $Li_{0.63}Na_{0.019}Co_{0.99}M_{0.01}O_{1.999}R_{0.001}$, $Li_{0.9}Na_{0.015}Co_{0.99}M_{0.01}O_{1.998}R_{0.002}$, $Li_{0.73}Na_{0.012}Co_{0.988}M_{0.012}O_{1.995}R_{0.005}$, $Li_{0.73}Na_{0.01}Co_{0.985}M_{0.015}O_{1.995}R_{0.005}$, $Li_{0.73}Na_{0.004}Co_{0.974}M_{0.026}O_{1.993}R_{0.007}$, $Li_{0.73}Na_{0.002}Co_{0.97}M_{0.03}O_{1.99}R_{0.01}$, $Li_{0.73}Na_{0.012}Co_{0.988}M_{0.012}O_{1.998}R_{0.002}$, $Li_{0.73}Na_{0.01}Co_{0.985}M_{0.015}O_{1.995}R_{0.005}$, $Li_{0.73}Na_{0.01}Co_{0.985}M_{0.015}O_{1.995}R_{0.005}$, $Li_{0.73}Na_{0.004}Co_{0.974}M_{0.026}O_{1.993}R_{0.007}$, and the like, where M includes at least one of Al, Mg, Ti, Mn, Fe, Ni, Zn, Cu, Nb, Cr, Y, or Zr, and R includes at least one of F or Cl.

More preferably, the positive active material includes but is not limited to $Li_{0.9}Na_{0.015}Co_{0.99}Al_{0.01}O_{1.998}F_{0.002}$, $Li_{0.73}Na_{0.012}Co_{0.988}Al_{0.012}O_{1.995}F_{0.005}$, $Li_{0.73}Na_{0.004}Co_{0.974}Al_{0.026}O_{1.993}Cl_{0.007}$, or $Li_{0.73}Na_{0.1}Co_{0.988}Mg_{0.015}O_{1.995}F_{0.005}$.

To lower the energy band of O, anions and cations with high electronegativity are used for doping. In some embodiments of this application, the ratio of the electronegativity of the M element cation to the electronegativity of the Co element cation is 1 to 2, and preferably, 1.05 to 1.64. Specifically, the electronegativity ratio may be, for example, 1.64, 1.58, 1.05, 1.23, and so on, without being limited herein.

In some embodiments of this application, the concentration of the R element on a surface of the positive active material is higher than the concentration of the R element inside the positive active material. The concentration of the R element is the ratio of $n_R$ (the molar content of the R element) to $n_{Co+M}$ (the sum of the molar content of the Co element and the molar content of the M element). The R elements concentrate on the surface of the positive active material to reduce the amount of active oxygen on the surface of the material, reduce the amount of oxygen released, and slow down the positive active material from oxidizing the electrolytic solution.

Preferably, a ratio of the concentration of the R element in a region from the surface of the positive active material to a depth of 50 nm to the concentration of the R element in other regions of the positive active material is (1 to 10):1. If the ratio is greater than 10:1, the doping concentration of the R element on the surface of the positive active material is much greater than the doping concentration of the R element inside the positive active material, CEI deposition occurs on the surface of the material or the Co—R is deposited on the surface, thereby deteriorating the impedance and further deteriorating the performance of the electrochemical device.

Preferably, an R element concentration difference at any position in other regions of the positive active material is less than 5%. The R element is evenly distributed inside the positive active material, so that the valence state of transition metal and the weight percent of lithium are the same between different parts, thereby not only stabilizing oxygen in different parts evenly, but also avoiding local overcharging or overintercalation. In this way, in different parts, the redox reaction occurs evenly and lithium ions are migrated evenly.

Further, the positive active material according to this application includes pores and/or gaps. Preferably, the positive active material includes both pores and gaps. A method for determining existence of pores on the surface of the particles of the positive active material is: performing SEM imaging of a particle, and observing the image to check whether any pores exist on the surface of the particle. A method for determining existence of gaps inside a particle is: cutting a particle by using a CP (cross-section polishing) technology, performing SEM imaging of the particle, and observing the image to check whether any gaps exist inside the particle.

In some embodiments of this application, the average particle diameter $D_{v50}$ of the positive active material is 10 μm to 25 μm. When the average particle diameter is too large, the diffusion path of lithium ions in large-diameter particles is longer, and the resistance that needs to be overcome during diffusion is greater. The crystal deformation and volume expansion of the positive active material caused by an intercalation process keep accumulating, thereby gradually making it difficult to proceed with the intercalation process. By controlling the particle diameter of the positive active material to be less than 25 μm, the embodiments of this application can improve the electrochemical kinetic performance and rate performance during the charge and discharge and mitigate the polarization phenomenon, making the battery has higher specific capacity, higher coulombic efficiency, and higher cycle performance. When the average particle diameter is too small, the specific surface area of the positive active material tends to be larger, and the surface side reactions increase. By controlling the particle diameter of the positive active material to be not less than 10 μm, this application prevents excessively small particle diameters of the positive active material, reduces the surface side reactions of the material, and also can effectively suppress the agglomeration between particles of the positive active material with an excessively small particle diameter, and ensure relatively high rate performance and cycle performance of the battery.

The specific surface area of the positive active material is 0.1 m²/g to 3 m²/g. By controlling the specific surface area of the positive active material to fall within the above range, this application can improve the stability of the positive active material to air, water and carbon dioxide, and reduce the reactivity of the electrolytic solution on the surface of the positive active material, thereby exerting the above effects to a greater extent, exerting the charge capacity and the discharge capacity of the positive electrode to a greater extent, and improving the cycle performance and safety performance. Preferably, the specific surface area of the positive active material according to this application is 0.72 m²/g to 2.5 m²/g.

It needs to be noted that the crystal structure of the positive active material may be determined by an X-ray powder diffractometer, for example, a Brucker D8A_A25 X-ray diffractometer manufactured by Brucker AxS, Germany, where a CuKα ray is used as a radiation source, a ray wavelength λ is equal to 1.5418 Å, the range of the 2θ angle in scanning is 10° to 90°, and the scanning speed is 4°/min.

The specific surface area of the positive active material has the same meaning as known in the art, and may be measured by using an instrument and a method known in the art. For example, the specific surface area is measured by using a specific surface area analysis and test method by means of nitrogen adsorption, and the value of the specific surface area is calculated by using a Brunauer Emmett Teller (BET) method. The specific surface area analysis and test by means of nitrogen adsorption may be performed by using a Tri Star II specific surface and porosity analyzer manufactured by Micromeritics, USA.

The average particle diameter $D_{v50}$ of the positive active material has the same meaning as known in the art, and may be measured by using an instrument and a method known in the art. For example, the average particle diameter may be measured conveniently by using a laser particle size analyzer such as a Mastersizer 3000 laser particle size analyzer manufactured by Malvern Instruments Ltd., UK.

The concentration of the R element of the positive active material may be analyzed using an electron energy loss spectrum known in the art. Based on the electron energy loss spectrum of the positive active material, the type and number of doping atoms in the region from the surface to a depth of 50 nm are analyzed. In the same way, the type and number of doping atoms in other regions are analyzed to obtain the depthwise longitudinal distribution of the R element in the positive active material.

Positive Electrode Sheet

A second aspect of this application provides a positive electrode sheet, including a positive current collector and a positive active material layer disposed on at least one surface of the positive current collector.

The positive current collector may be a metal foil, a carbon-coated metal foil, or a porous metal sheet, and preferably, an aluminum foil.

The positive active material layer includes the positive active material according to the first aspect of this application. Optionally, the positive active material in the positive active material layer is $Li_xNa_zCo_{1-y}M_yO_{2-\delta}R_\delta$.

The compacted density of the positive active material layer is 3.0 g/cm³ to 4.4 g/cm³, and preferably, the compacted density of the positive active material layer is 4.12 g/cm³ to 4.22 g/cm³. When the compacted density of the positive active material layer falls within the above range, the specific capacity and energy density of the battery are increased, and the rate performance and cycle performance of the battery are improved.

The compacted density of the positive active material may be measured by using an instrument and a method known in the art, for example, may be measured conveniently by using an electronic pressure testing machine such as a UTM7305 electronic pressure testing machine.

Further, the positive active material layer further includes a binder and a conductive agent.

The binder may be one or more of styrene butadiene rubber (SBR), water-based acrylic resin, polyvinylidene difluoride (PVDF), polytetrafluoroethylene (PTFE), poly (ethylene-co-vinyl acetate) (EVA), or polyvinyl alcohol (PVA).

The conductive agent may be one or more of superconductive carbon, acetylene black, carbon black, Ketjen black, carbon dots, carbon nanotubes, graphene, and carbon nanofibers.

The positive electrode sheet may be prepared according to a conventional method in this field. A general method for preparing the positive electrode sheet is: dispersing the positive active material and optionally the conductive agent and the binder in a solvent (such as N-methyl-pyrrolidone, NMP for short) to form a homogeneous positive slurry, coating a positive current collector with the positive slurry, and performing steps such as drying and cold pressing to obtain a positive electrode sheet.

Because the positive active material according to the first aspect of this application is adopted, the positive electrode sheet according to this application achieves relatively high comprehensive electrochemical performance and safety performance.

Electrochemical Device

A third aspect of this application provides an electrochemical device containing the positive active material layer according to the first aspect of this application.

The compacted density of the positive active material layer is 3.0 g/cm$^3$ to 4.4 g/cm$^3$, and preferably, the compacted density of the positive active material layer is 4.12 g/cm$^3$ to 4.22 g/cm$^3$. When the compacted density of the positive active material layer falls within the above range, the specific capacity and energy density of the battery are increased, and the rate performance and cycle performance of the battery are improved.

The compacted density of the positive active material may be measured by using an instrument and a method known in the art, for example, may be measured conveniently by using an electronic pressure testing machine such as a UTM7305 electronic pressure testing machine.

Further, when a capacity of the electrochemical device in a fully discharged state is not less than 180 mAh/g, as analyzed by using an X-ray diffraction method, a main peak in an XRD pattern of the positive active material falls within a range of 18° to 19°, and a peak width at half height of the main peak is 0° to 0.5°. After the positive active material undergoes cycles, the main peak position and the peak width at half height remain unchanged, indicating that the overall layered structure of the positive active material has not changed significantly, and that the structure of the positive active material is highly reversible.

In some embodiments of this application, the electrochemical device further includes a negative electrode sheet, a separator, and an electrolytic solution.

The negative electrode sheet may include a negative current collector and a negative active material layer disposed on the negative current collector. For example, the negative current collector includes two surfaces opposite to each other. The negative active material layer is stacked on either or both of the two surfaces of the negative current collector. The negative current collector may be a metal foil, a carbon-coated metal foil, or a porous metal sheet, or the like, and preferably, a copper foil.

The negative active material layer generally includes a negative active material and optionally includes a conductive agent, a binder, and a thickener. The negative active material may be one or more of natural graphite, artificial graphite, mesocarbon microbead (MCMB), hard carbon, and soft carbon. The conductive agent may be one or more of superconductive carbon, acetylene black, carbon black, Ketjen black, carbon dots, carbon nanotubes, graphene, and carbon nanofibers. The binder may be one or more of styrene butadiene rubber (SBR), water-based acrylic resin, and carboxymethyl cellulose (CMC). The thickener may be carboxymethyl cellulose (CMC). However, this application is not limited to such materials. This application may use other materials that can be used as a negative active material, a conductive agent, a binder, or a thickener of the lithium-ion battery.

The foregoing negative electrode sheet may be prepared according to a conventional method in this field. Generally, a method for preparing the negative electrode sheet includes: dispersing the negative active material and optionally the conductive agent, the binder, and the thickener in a solvent such as deionized water to form a homogeneous negative slurry, coating a negative current collector with the negative slurry, and performing steps such as drying and cold pressing to obtain a negative electrode sheet.

The separator is not specifically limited, and may be any well-known porous-structured separator that is electrochemically stable and chemically stable, for example, may be a single-layer or multi-layer film that is one or more of glass fiber, non-woven fabric, polyethylene, polypropylene, or polyvinylidene difluoride.

The electrolytic solution includes lithium salt and an organic solvent. The specific type and composition of the lithium salt and organic solvent are not specifically limited, and may be selected according to actual requirements. Preferably, the lithium salt may include one or more of lithium hexafluorophosphate, lithium tetrafluoroborate, or lithium perchlorate; and the organic solvent may include one or more of cyclic carbonate, chain carbonate, or carboxylate. The electrolytic solution may further contain functional additives, such as vinylene carbonate, ethylene sulfate, propane sultone, fluoroethylene carbonate, or the like.

Because the positive active material according to the first aspect of this application is adopted, the electrochemical device according to this application has a relatively high specific capacity and a high voltage plateau, and achieves relatively high cycle performance and safety performance, and an interface that is stable under a high voltage and a structure that is highly reversible.

According to a fourth aspect, this application further provides a method for preparing a positive active material. The method includes the following steps S10 to S30:

S10. Making a co-precipitate from cobalt salt and M-containing salt by means of liquid phase precipitation, and sintering the co-precipitate to obtain an M-doped $(Co_{1-y}M_y)_3O_4$ powder, where $0 \leq y < 0.15$;

S20. Sintering a mixed powder of $(Co_{1-y}M_y)_3O_4$, $Na_2CO_3$, and $Li_aR$ ($0 < a < 3$) in an oxygen atmosphere at a stoichiometric ratio to obtain $Na_mCo_{1-y}M_yO_{2-\delta}R_\delta$ with a P6$_3$mc crystal structure, where $0.6 < m < 1$; and S30. Mixing $Na_mCo_{1-y}M_yO_{2-\delta}R_\delta$ and lithium-containing molten salt at a molar ratio of 0.01 to 0.2 between the Na element and the Li element, performing ion exchange reaction in an air atmosphere, and washing and drying a reaction product thereof to obtain a positive active material $Li_xNa_zCo_{1-y}M_yO_{2-\delta}R_\delta$, where M includes at least one of Al, Mg, Ti, Mn, Fe, Ni, Zn, Cu, Nb, Cr, Y, or Zr, R includes at least one of F or Cl, $0.6 < x < 0.95$, $0 \leq y < 0.15$, $0 \leq z < 0.03$, $0 < \delta \leq 0.01$.

In this application, the M-doped $(Co_{1-y}M_y)_3O_4$ precursor powder is prepared by liquid phase co-precipitating and sintering, where $0 \leq y < 0.15$. Then the precursor powder is sintered together with sodium carbonate and lithium salt by means of solid phase sintering to obtain $Na_mCo_{1-y}M_yO_{2-\delta}R_\delta$ with a P6$_3$mc crystal structure. Finally, the positive active material $Li_xNa_zCo_{1-y}M_yO_{2-\delta}R_\delta$ with a P6$_3$mc crystal structure is synthesized by means of ion exchange. The preparation process is safe and controllable. Therefore, the prepared positive active material has the specific chemical composition and structure specified in this application to significantly improve the electrochemical performance of the positive active material. In this way, the electrochemical device has a relatively high specific capacity and a high voltage plateau, and achieves relatively high cycle performance and safety performance, an interface that is stable under a high voltage, and a structure that is highly reversible.

Specifically, the step S10, in which a co-precipitate is made from cobalt salt and M-containing salt by means of liquid phase precipitation, includes the following detailed steps:

S11. Mixing the cobalt salt and the M-containing salt at a molar ratio of (1-y):y between the Co element and the M element, and adding the mixture into a solvent to obtain a mixed solution; and S12. Adding a precipitant and a complexant into the mixed solution to obtain a reaction solution, and adjusting the pH value of the reaction solution to a preset range, so that the reaction solution undergoes a co-precipitation reaction at a preset temperature and a preset stirring speed to obtain a co-precipitate.

In some preferred embodiments, in step S10, the cobalt salt is at least one of cobalt nitrate, cobalt chloride, cobalt sulfate, or cobalt acetate; and the M-containing salt is at least one of M-containing nitrate, chloride, sulfate, or acetate.

The solvent is at least one of deionized water, methanol, ethanol, acetone, isopropanol, or n-hexanol.

In some preferred embodiments, in step S12, the precipitant is at least one of sodium hydroxide, potassium hydroxide, sodium bicarbonate, potassium bicarbonate, sodium carbonate, or potassium carbonate. It needs to be noted that before the precipitant is added into the mixed solution, the precipitant may be pre-blended to obtain a precipitant solution. The solvent used to blend the precipitant solution may be at least one of deionized water, methanol, ethanol, acetone, isopropanol, or n-hexanol.

Further, the concentration of the precipitant in the precipitant solution is preferably 0.1 mol/L to 3 mol/L, and more preferably, 1 mol/L to 3 mol/L.

In some preferred embodiments, in step S12, the complexant is at least one of ammonia, ammonium carbonate, ammonium bicarbonate, urea, hexamethylenetetramine, ethylenediaminetetraacetic acid, citric acid, or ascorbic acid. It needs to be noted that before the complexant is added into the mixed solution, the complexant may be pre-blended to obtain a complexant solution. The solvent used to blend the complexant solution may be at least one of deionized water, methanol, ethanol, acetone, isopropanol, or n-hexanol.

Further, the concentration of the complexant in the complexant solution is preferably 0.1 mol/L to 3 mol/L, and more preferably, 0.5 mol/L to 1.5 mol/L.

The pH value of the reaction solution affects the precipitation speed of each metal ion, thereby directly affecting the nucleation and growth speed of crystals of a transition metal source, and further affecting the chemical composition and structure of the transition metal source, and ultimately affecting the chemical composition and structure of the positive active material. To implement the positive active material according to this application, in step S12, the pH value of the reaction solution is controlled to be 5 to 9, for example, 5, 6, 7, 8, or 9, or another value within the above range. In a specific embodiment, the pH value of the reaction solution may be adjusted by adjusting the type and content of the precipitant and/or complexant.

In addition, the temperature of the reaction solution directly affects the speed and reaction yield of the chemical reaction. The reaction time affects the growth process of the reaction product, and further affects the chemical composition and structure of the reaction product. Preferably, in step S12, the reaction temperature is 25° C. to 100° C., and the reaction time is 2 hours to 30 hours.

Optionally, step S10 may further include: washing the co-precipitate by using an appropriate amount of detergent and drying. It needs to be noted that the detergent used for washing and the number of times of washing are not specifically limited in this application, and may be selected as actually required as long as the remaining ions on the surface of the co-precipitate are removed. For example, the detergent may be deionized water.

In step S10, the sintering temperature and sintering time of the co-precipitate affect the specific surface area, particle diameter, morphology, and crystal structure of the reaction product. Preferably, in step S13, the sintering temperature of the co-precipitate is 400° C. to 800° C., and more preferably, 450° C. to 600° C. The sintering time of the co-precipitate is 5 to 20 hours, and preferably, 12 to 15 hours.

In step S10, the sintering process may be performed in an air or oxygen atmosphere.

In some preferred embodiments, in step S20, $(Co_{1-y}M_y)_3O_4$, $Na_2CO_3$, and $Li_aR$ are mixed at a molar ratio of 0.7:(1-y):y: $\delta$ between Na, Co, M, and R, and a molar ratio of (0.5 to 0.8):1 between Na and Co. Preferably, the molar ratio between Na and Co is 0.74:1.

In step S20, the sintering temperature and sintering time affect the specific surface area, particle diameter, morphology, and crystal structure of the reaction product. Preferably, in step S20, the sintering temperature is 700° C. to 1000° C., and more preferably, 800° C. to 900° C.; and the sintering time is preferably 36 to 56 hours, and more preferably, 40 to 50 hours. The sintering process may be performed in an air or oxygen atmosphere.

In some preferred embodiments, in step S30, the lithium-containing molten salt includes at least one of lithium nitrate, lithium chloride, or lithium hydroxide.

In step S30, $Na_mCo_{1-y}M_yO_{2-\delta}R_\delta$ and the lithium-containing molten salt are mixed at a molar ratio of (0.01 to 0.2):1 between the Na element and the Li element. Preferably, the molar ratio between the Na element and the Li element is 0.03:1.

In step S30, the sintering temperature and sintering time affect the specific surface area, particle diameter, morphology, and crystal structure of the reaction product. Preferably, in step S30, the sintering temperature is 200° C. to 400° C., and more preferably, 250° C. to 350° C.; and the sintering time is preferably 2 to 8 hours, and more preferably, 4 to 6 hours. The sintering process may be performed in an air or oxygen atmosphere.

Optionally, step S30 may further include: washing the sintering product by using an appropriate amount of detergent and drying. It needs to be noted that the detergent used for washing and the number of times of washing are not specifically limited in this application, and may be selected as actually required as long as the molten salt on the surface of the sintering product is removed. For example, the detergent may be deionized water.

It needs to be noted that the final product, that is, the positive active material $Li_xNa_zCo_{1-y}M_yO_{2-\delta}R_\delta$, has a $P6_3mc$ crystal structure. However, the final product may also contain some positive active materials with an R-3m crystal structure.

In the process of preparing the positive active material according to this application, the type, content, and pH value of reactants, the type and concentration of the precipitant, the type and concentration of the complexant, the sintering temperature, the sintering time, and the like are comprehensively adjusted and controlled to make the positive active material possess a chemical composition and structure specified in this application, thereby significantly improving the electrochemical performance of the positive active material and improving the specific capacity, cycle performance, and safety performance of the lithium-ion battery.

This application is further described below with reference to specific embodiments. Understandably, the embodiments are merely intended to illustrate this application but not to limit the scope of this application.

Preparing a Positive Active Material

S10. Mixing cobalt chloride and M-containing sulfate at a molar ratio of $(1-y):y$ between the Co element and the M element, and adding the mixture into deionized water to obtain a mixed solution; adding a precipitant and a complexant into the mixed solution to obtain a reaction solution, and adjusting the pH value of the reaction solution to 6, and letting the reaction solution undergo a co-precipitation reaction under stirring to obtain a co-precipitate; sintering the co-precipitate at 600° C. to 700° C. to obtain an M-doped $(Co_{1-y}M_y)_3O_4$ powder, where $0 \leq y < 0.15$;

S20. Mixing the $(Co_{1-y}M_y)_3O_4$ powder, $Na_2CO_3$ powder, and $Li_dR$ powder at a molar ratio of $0.7:(1-y):y: \delta$ between Na, Co, M, and R to obtain a mixed powder, and sintering the mixed powder at 800° C. to 900° C. in an oxygen atmosphere for 48 hours to obtain $Na_mCo_{1-y}M_yO_{2-\delta}R_\delta$ with a $P6_3mc$ crystal structure, where $0.6 < m < 1$; and S30. Mixing $Na_mCo_{1-y}M_yO_{2-\delta}R_\delta$ and lithium chloride at a molar ratio of 0.01 to 0.2 between the Na element and the Li element, heating the mixture in an air atmosphere until 250° C. to 350° C., performing ion exchange reaction for 6 hours, and washing and drying a reaction product thereof to obtain a positive active material $Li_xNa_zCo_{1-y}M_yO_{2-\delta}R_\delta$, where M includes at least one of Al, Mg, Ti, Mn, Fe, Ni, Zn, Cu, Nb, Cr, Y, or Zr, R includes at least one of F or Cl, $0.6 < x < 0.95$, $0 \leq y < 0.15$, $0 \leq z < 0.03$, $0 < \delta \leq 0.01$.

The positive active materials in Embodiments 1 to 10 and Comparative Embodiments 1 to 6 are all prepared under the foregoing reaction conditions, and the prepared positive active materials are shown in Table 1.

TABLE 1

| $Li_xNa_zCo_{1-y}M_yO_{2-\delta}R_\delta$ Sample | | x | z | y | δ |
|---|---|---|---|---|---|
| M = Al, R = F | Embodiment 1 | 0.63 | 0.019 | 0.01 | 0.001 |
| | Embodiment 2 | 0.93 | 0.015 | 0.01 | 0.002 |
| | Embodiment 3 | 0.73 | 0.012 | 0.012 | 0.005 |
| M = Al, R = Cl | Embodiment 4 | 0.73 | 0.01 | 0.015 | 0.005 |
| | Embodiment 5 | 0.73 | 0.004 | 0.026 | 0.007 |
| | Embodiment 6 | 0.73 | 0.002 | 0.03 | 0.01 |
| M = Mg, R = F | Embodiment 7 | 0.73 | 0.012 | 0.012 | 0.002 |
| | Embodiment 8 | 0.73 | 0.01 | 0.015 | 0.005 |
| M = Mg, R = Cl | Embodiment 9 | 0.73 | 0.01 | 0.015 | 0.005 |
| | Embodiment 10 | 0.73 | 0.004 | 0.026 | 0.007 |
| M = Al | Comparative Embodiment 1 | 0.73 | 0.012 | 0.012 | 0 |
| | Comparative Embodiment 2 | 0.73 | 0.002 | 0.03 | 0 |

TABLE 1-continued

| $Li_xNa_zCo_{1-y}M_yO_{2-\delta}R_\delta$ Sample | | x | z | y | δ |
|---|---|---|---|---|---|
| M = Mg | Comparative Embodiment 3 | 0.73 | 0.012 | 0.012 | 0 |
| | Comparative Embodiment 4 | 0.73 | 0.01 | 0.015 | 0 |
| M = Mg, R = F | Comparative Embodiment 5 | 0.73 | 0.012 | 0.012 | 0.02 |
| | Comparative Embodiment 6 | 0.73 | 0.01 | 0.015 | 0.05 |

Preparing a Lithium-Ion Battery

1) Preparing a Positive Electrode Sheet

Mixing and stirring the prepared positive active material, conductive carbon black (Super-P), and a binder polyvinylidene difluoride (PVDF) thoroughly at a weight ratio of 95:2:3 in an appropriate amount of N-methyl-pyrrolidone (NMP) to form a homogeneous positive slurry; coating a 12 μm-thick aluminum foil with the positive slurry, and performing drying, cold pressing, cutting, and tab welding to obtain a positive electrode.

2) Preparing a Negative Electrode Sheet

Mixing artificial graphite, styrene butadiene rubber, and sodium carboxymethyl cellulose at a weight ratio of 96:2:2, mixing them with deionized water, and then stirring evenly to obtain a negative slurry; coating a 12 μm-thick copper foil with the negative slurry. Performing drying, cold pressing, cutting, and tab welding to obtain a negative electrode.

3) Preparing a Separator: Using a Polyethylene (PE) Porous Polymer Film as a Separator.

4) Preparing an Electrolytic Solution

Mixing ethylene carbonate (EC), propylene carbonate (PC), and diethyl carbonate (DEC) at a weight ratio of 1:1:1 in a dry argon environment, and adding $LiPF_6$ and mixing evenly to form an electrolytic solution, where the concentration of $LiPF_6$ is 1.15 mol/L.

5). Stacking the positive electrode sheet, the separator, and the negative electrode sheet sequentially and winding the sheets, putting the sheets into an outer package foil, and leaving an injection hole available. Injecting the electrolytic solution from the injection hole, and performing the steps such as sealing, chemical formation, and capacity grading to make a lithium-ion battery.

Performance Test:

(1) Testing the Capacity Exertion and Cycle Performance

Taking the lithium-ion batteries prepared in the embodiments and comparative embodiments, charging the battery at 45° C. and a normal pressure (0.1 MPa) and at a constant current of 0.1 C until the voltage reaches 4.7 V, and then charging the battery at a constant voltage of 4.7 V until the current reaches 0.05 C, recording a charge capacity at this time as a first-cycle charge capacity of the lithium-ion battery; then leaving the battery to stand for 5 minutes, and then discharging the battery at a constant current of 0.1 C until the voltage reaches 3.0 V, and leaving the battery to stand for 5 minutes, thereby completing a charge-discharge cycle. Recording the discharge capacity at this time as a first-cycle discharge capacity of the lithium-ion battery, that is, an initial capacity of the lithium-ion battery. Performing the charge-discharge tests on the lithium-ion battery for 50 cycles by the method described above, and detecting the battery to obtain a $50^{th}$-cycle discharge capacity. $50^{th}$-cycle capacity retention rate of the lithium-ion battery $(\%)=50^{th}$-cycle discharge capacity/first-cycle discharge capacity×100%.

Table 2 shows the position of the O1s main peak in an XPS spectrum of the positive active material in Embodiments 1 to 10 and Comparative Embodiments 1 to 6 as analyzed using X-ray photoelectron spectroscopy, and Table 2 also shows the performance parameters of the lithium-ion battery containing the positive active material.

14 thereby significantly improving the crystal stability of the positive active material under a high temperature and a high voltage. However, as can be seen from Comparative Embodiments 5 to 6, the amount of the doping R element needs to be not excessive. Otherwise, both the first-cycle discharge capacity under 45° C. and the 50$^{th}$-cycle capacity

TABLE 2

| Sample | Ingredients of positive active material | Position of O1s main peak (eV) | First-cycle discharge capacity under 45° C. (mAh/g) | Capacity retention rate upon completion of 50 cycles under 45° C. (%) |
|---|---|---|---|---|
| Embodiment 1 | $Li_{0.63}Na_{0.019}Co_{0.99}Al_{0.01}O_{1.999}F_{0.001}$ | 530.9 | 237 | 90 |
| Embodiment 2 | $Li_{0.93}Na_{0.015}Co_{0.99}Al_{0.01}O_{1.998}F_{0.002}$ | 531.45 | 239 | 91 |
| Embodiment 3 | $Li_{0.73}Na_{0.012}Co_{0.988}Al_{0.012}O_{1.995}F_{0.005}$ | 531.87 | 235 | 91 |
| Embodiment 4 | $Li_{0.73}Na_{0.01}Co_{0.985}Al_{0.015}O_{1.995}Cl_{0.005}$ | 530.8 | 235 | 91 |
| Embodiment 5 | $Li_{0.73}Na_{0.004}Co_{0.974}Al_{0.026}O_{1.991}Cl_{0.007}$ | 531.5 | 235.7 | 91 |
| Embodiment 6 | $Li_{0.73}Na_{0.002}Co_{0.97}Al_{0.03}O_{1.99}Cl_{0.01}$ | 532 | 238 | 89.9 |
| Embodiment 7 | $Li_{0.73}Na_{0.012}Co_{0.988}Mg_{0.012}O_{1.998}F_{0.002}$ | 531 | 233 | 92 |
| Embodiment 8 | $Li_{0.73}Na_{0.01}Co_{0.985}Mg_{0.015}O_{1.995}F_{0.005}$ | 531.9 | 236 | 93 |
| Embodiment 9 | $Li_{0.73}Na_{0.01}Co_{0.985}Mg_{0.015}O_{1.995}Cl_{0.005}$ | 530.2 | 234 | 88 |
| Embodiment 10 | $Li_{0.73}Na_{0.004}Co_{0.974}Mg_{0.026}O_{1.993}Cl_{0.007}$ | 530.9 | 233 | 83 |
| Comparative Embodiment 1 | $Li_{0.73}Na_{0.012}Co_{0.988}Al_{0.012}O_2$ | 529.5 | 235 | 60 |
| Comparative Embodiment 2 | $Li_{0.73}Na_{0.002}Co_{0.97}Al_{0.03}O_2$ | 529.6 | 232 | 48 |
| Comparative Embodiment 3 | $Li_{0.73}Na_{0.012}Co_{0.988}Mg_{0.012}O_2$ | 528.7 | 234 | 60 |
| Comparative Embodiment 4 | $Li_{0.73}Na_{0.01}Co_{0.985}Mg_{0.015}O_2$ | 529.1 | 239 | 67 |
| Comparative Embodiment 5 | $Li_{0.73}Na_{0.012}Co_{0.988}Mg_{0.012}O_{1.98}F_{0.02}$ | 532.9 | 215 | 60 |
| Comparative Embodiment 6 | $Li_{0.73}Na_{0.01}Co_{0.985}Mg_{0.015}O_{1.95}F_{0.05}$ | 533.2 | 208 | 67 |

As can be seen from the comparative analysis of the data in Table 2, the positive active materials in Comparative Embodiments 1 to 4 are doped with merely cations such as Al and Mg. The first-cycle discharge capacity differs scarcely between Comparative Embodiments 1 to 4 and Embodiments 3, 6, 7, and 8 under a high voltage (higher than 4.6 V). However, with the doping with just cations, because the position of the O1s main peak is relatively low, the oxygen structure is not stable enough to mitigate superficial phase transition of the positive active material under a high voltage although the same P6$_3$mc crystal structure is adopted. Therefore, as the phase transition keeps spreading inward, the capacity of the lithium battery attenuates rapidly. In contrast, in Embodiments 3, 6, 7, and 8, the positive active material is doped with a small amount of R element, the position of the O1s main peak of the obtained positive active material is relatively high, and can reduce oxygen activity, retention rate drop significantly. That is because the R element concentrated to a specific extent on the surface of the positive active material combines with active lithium massively to form a dense LiF layer to deteriorate the interfacial impedance and cause capacity loss.

Further, the positive active materials in Embodiments 11 and 12 and Comparative Embodiment 7 are prepared according to the above preparation method. The ratio of the electronegativity of the M element to the electronegativity of the Co element in the tested positive active materials is shown in Table 3, and the performance parameters of the lithium-ion battery containing the positive active material are shown in Table 3.

TABLE 3

| Sample | Positive active material | Electronegativity ratio | First-cycle discharge capacity under 45° C. (mAh/g) | Capacity retention rate upon completion of 50 cycles under 45° C. (%) |
|---|---|---|---|---|
| Embodiment 3 | $Li_{0.73}Na_{0.012}Co_{0.988}Al_{0.012}O_{1.995}F_{0.005}$ | 1.64 | 235 | 91 |
| Embodiment 11 | $Li_{0.73}Na_{0.012}Co_{0.988}Mg_{0.012}O_{1.995}F_{0.005}$ | 1.05 | 238 | 92 |
| Embodiment 12 | $Li_{0.73}Na_{0.012}Co_{0.988}Ti_{0.012}O_{1.995}F_{0.005}$ | 1.58 | 237 | 92.5 |
| Comparative Embodiment 7 | $Li_{0.73}Na_{0.012}Co_{0.988}Sr_{0.012}O_{1.995}F_{0.005}$ | 0.57 | 219 | 45 |

As can be seen from the comparative analysis of the data in Table 3, the cation M in Embodiment 3 is Al$^{3+}$, the cation M in Embodiment 11 is $Mg^{2+}$, the cation M in Embodiment 12 is $Ti^{3+}$, and the electronegativity ratio between the cation M and $Co^{3+}$ is 1 to 2. In contrast, in Comparative Embodiment 7, the cation M is $Sr^{2+}$, and the electronegativity ratio between $Sr^{2+}$ to $Co^{3+}$ is merely 0.57. Both the first-cycle discharge capacity and the $50^{th}$-cycle capacity retention rate of the battery prepared according to Comparative Embodiment 21 decrease significantly, and the cycle stability deteriorates drastically. That is because the M-O bond formed by the M element cation of higher electronegativity than Co can further lower the energy band structure of oxygen, and reduce the energy band overlap between Co and oxygen, thereby reducing the activity of oxygen and stabilizing oxygen. In this way, the positive active material is of higher stability under a high temperature and a high voltage.

Further, the positive active materials in Embodiments 13 to 16 are prepared according to the foregoing preparation method. The positive active material prepared in Embodiment 3 and the positive active materials prepared in Embodiments 13 to 16 have the same ingredient, that is, $Li_{0.73}Na_{0.012}Co_{0.988}Al_{0.012}O_{1.995}F_{0.005}$. The ingredient is analyzed using XPS, so as to test the R element concentration on the surface of the particle and the R element concentration inside the particle, the ratio of the R element concentration in a region from the surface of the particle to a depth of 50 nm to the R element concentration in other regions, and the R element concentration difference at any position in other regions. Table 4 shows the performance parameters of the lithium-ion battery containing the positive active material.

TABLE 4

| Positive active material | Sample | Ratio of concentration between particle surface and interior | Concentration difference in any region inside particle | First-cycle discharge capacity under 45° C. (mAb/g) | Capacity retention rate upon completion of 50 cycles under 45° C. (%) |
|---|---|---|---|---|---|
| $Li_{0.73}Na_{0.012}Co_{0.988}Al_{0.012}O_{1.995}F_{0.0}$ | Embodiment 3 | 2:1 | 1% | 235 | 91 |
| | Embodiment 13 | 3.5:1 | 2.50% | 238 | 93 |
| | Embodiment 14 | 10:1 | 4.9% | 236 | 88 |
| | Embodiment 15 | 11:1 | 2.50% | 220 | 83 |
| | Embodiment 16 | 1.05:1 | 12% | 214 | 75 |

As can be seen from the comparative analysis of the data in Table 4, the ratio of the R element concentration in a region from the surface of the particle to a depth of 50 nm to the R element concentration in other regions of the positive active material is (1-10):1. When the R element concentration difference at any position in other regions is less than 5%, both the first-cycle discharge capacity and the $50^{th}$-cycle capacity retention rate of the lithium battery can be maintained at a relatively high level. When the ratio of the R element concentration in a region from the surface of the particle to a depth of 50 nm to the R element concentration in other regions of the positive active material is greater than 10:1, or when the R element concentration difference at any position in other regions is greater than 5%, both the first-cycle discharge capacity and the $50^{th}$-cycle capacity retention rate of the lithium battery decrease to some extent. That is because the doping concentration of the R element on the surface of the positive active material is much greater than the doping concentration of the R element inside the positive active material, CEI deposition occurs on the surface of the material or the Co—R is deposited on the surface, thereby deteriorating the impedance. Inhomogeneity of concentration of the R element inside the positive active material is prone to cause local overcharge or over-intercalation, and affect the first-cycle discharge capacity and the cycle capacity retention rate of the lithium battery.

Further, the positive active materials in Embodiments 17 to 19 are prepared according to the foregoing preparation method. The positive active material prepared in Embodiment 3 and the positive active materials prepared in Embodiments 17 to 19 have the same ingredient, that is, $Li_{0.73}Na_{0.012}Co_{0.988}Al_{0.012}O_{1.995}F_{0.005}$. The ingredient is analyzed using an electron microscope to check the pores on the surface of the particles and the internal gaps. Table 5 shows the performance parameters of the lithium-ion battery containing the foregoing positive active material.

TABLE 5

| Positive active material | Sample | Is there any pore | Is there any gap | First-cycle discharge capacity under 45° C. (mAh/g) | Capacity retention rate upon completion of 50 cycles under 45° C. (%) |
|---|---|---|---|---|---|
| $Li_{0.73}Na_{0.012}Co_{0.988}Al_{0.012}O_{1.995}F_{0.005}$ | Embodiment 3 | Yes | Yes | 235 | 91 |
| | Embodiment 17 | Yes | No | 210 | 82 |
| | Embodiment 18 | No | Yes | 220 | 85 |
| | Embodiment 19 | No | No | 205 | 80 |

As can be seen from Table 5, the positive active material prepared in Embodiment 3 includes pores and gaps. The first-cycle discharge capacity of the battery prepared according to Embodiment 3 is up to 235 mAh/g, and the $50^{th}$-cycle capacity retention rate is up to 91%. In contrast, both the first-cycle discharge capacity and the 50th-cycle capacity retention rate of the batteries prepared according to Embodiments 17 to 19 decrease to some extent. That is because the pore and gap structures of the particles help to release the stress and strain generated on the surface of and/or inside the active material during the cycles and stabilize the interface between the positive active material and the electrolytic solution, thereby improving the cycle capacity retention rate and improving the cycle stability under a high voltage.

Further, the positive active materials in Embodiments 20 to 22 are prepared according to the foregoing preparation method. The positive active materials prepared in Embodiments 20 to 22 have the same ingredient, that is, $Li_{0.73}Na_{0.012}Co_{0.988}Al_{0.012}O_{1.995}F_{0.005}$. Table 6 shows the measured specific surface area of the positive active material, and Table 6 also shows the performance parameters of the lithium-ion battery containing the foregoing positive active material.

area, improving the stability of the positive active material to air, water and carbon dioxide, reducing the reactivity of the electrolytic solution on the surface of the positive active material, improving the cycle capacity retention rate, and improving the cycle stability under a high voltage. The specific surface area in Embodiment 22 reaches 3.2 $m^2$/g which is excessive, thereby increasing the reactivity of the electrolytic solution on the surface of the positive active material, increasing the side reactions on the surface of the material, and decreasing both the cycle capacity retention rate and the cycle stability under a high voltage to some extent.

Further, the positive active materials in Embodiments 23 to 24 are prepared according to the foregoing preparation method. The positive active material prepared in Embodiment 3 and the positive active materials prepared in Embodiments 23 to 24 have the same ingredient, that is, $Li_{0.73}Na_{0.012}Co_{0.988}Al_{0.012}O_{1.995}F_{0.005}$. Table 7 shows the performance parameters of the lithium-ion battery containing the foregoing positive active material. When the capacity of the battery in the fully discharged state is not less than 180 mAh/g, as analyzed using an X-ray diffraction method, the

TABLE 6

| Positive active material | Sample | Specific surface area ($m^2$/g) | First-cycle discharge capacity under 45° C. (mAh/g) | Capacity retention rate upon completion of 50 cycles under 45° C. (%) |
|---|---|---|---|---|
| $Li_{0.73}Na_{0.012}Co_{0.988}Al_{0.012}O_{1.995}F_{0.005}$ | Embodiment 3 | 0.72 | 235 | 91 |
| | Embodiment 20 | 1.2 | 238 | 93 |
| | Embodiment 21 | 2.5 | 235 | 90 |
| | Embodiment 22 | 3.2 | 231 | 80 |

As can be seen from Table 6, the specific surface area in Embodiments 3, 20, and 21 falls within a range of 0.72 $m^2$/g to 2.5 $m^2$/g, thereby avoiding an excessive specific surface main peak range and the peak width at half height of the main peak in an XRD pattern of the positive active material are shown in Table 7.

TABLE 7

| Positive active material | Sample | Main peak range (°) | Peak width at half height (°) | First-cycle discharge capacity under 45° C. (mAh/g) | Capacity retention rate upon completion of 50 cycles under 45° C. (%) |
|---|---|---|---|---|---|
| $Li_{0.73}Na_{0.012}Co_{0.988}Al_{0.012}O_{1.995}F_{0.005}$ | Embodiment 3 | 18.5 | 0.2 | 235 | 91 |
| | Embodiment 23 | 18.5 | 0.4 | 238 | 90 |
| | Embodiment 24 | 18.5 | 0.5 | 231 | 89 |

As can be seen from Table 7, in the XRD pattern of the positive active material in Embodiments 3, 23, and 24, the main peak falls within a range of 18° to 19°, and the peak width at half height of the main peak is 0° to 0.5°. Evidently, when the peak width at half height of the main peak of the positive active material is 0° to 0.5°, the crystal structure of the positive active material is more stable, thereby improving the stability of the positive active material to air, water and carbon dioxide, reducing the reactivity of the electrolytic solution on the surface of the positive active material, improving the cycle capacity retention rate, and improving the cycle stability under a high voltage.

This application has been disclosed above with reference to exemplary embodiments, but the exemplary embodiments are not intended to limit the claims. Any person skilled in the art may make various variations and modifications to this application without departing from the conception of this application. Therefore, the protection scope of this application is subject to the claims hereof.

What is claimed is:

1. A positive active material, comprising: a lithium transition metal composite oxide containing Co and R elements and an M element; the lithium transition metal composite oxide has a $P6_3mc$ crystal structure;

wherein the M element comprises at least one of Al, Mg, Ti, Mn, Fe, Ni, Zn, Cu, Nb, Cr, Y, or Zr;

the R element comprises at least one of F or Cl;

a molar content of the R element is $n_R$, a sum of a molar content of the Co element and a molar content of the M element is $n_{Co+M}$, and a ratio $\delta$ of $n_R$ to $n_{Co+M}$ is $0<\delta\leq0.01$.

2. The positive active material according to claim 1, wherein the positive active material satisfies at least one of the following conditions:

a. the positive active material further comprises a Li element, a molar content of the Li element is $n_{Li}$, and a ratio x of $n_{Li}$ to $n_{Co+M}$ is $0.6<x<0.95$;

b. the positive active material further comprises an Na element, a molar content of the Na element is $n_{Na}$, and a ratio z of $n_{Na}$ to $n_{Co+M}$ is $0<z<0.03$; and c. the molar content of the M element is $n_M$, a ratio y of $n_M$ to $n_{Co+M}$ is $0\leq y<0.15$, the molar content of the Co element is $n_{Co}$, and a ratio of $n_{Co}$ to $n_{Co+M}$ is 1-y.

3. The positive active material according to claim 2, wherein a chemical general formula of the positive active material is $Li_xNa_zCo_{1-y}M_yO_{2-\delta}R_\delta$, wherein $0.6<x<0.95$, $0\leq y<0.15$, $0\leq z<0.03$, and $0<\delta\leq0.01$.

4. The positive active material according to claim 1, wherein as analyzed using X-ray photoelectron spectroscopy, an XPS spectrum of the positive active material contains an O1s peak in a range of 530 eV to 535 eV.

5. The positive active material according to claim 1, wherein a ratio of electronegativity of an M element cation to electronegativity of a Co element cation is 1 to 2.

6. The positive active material according to claim 5, wherein the ratio of electronegativity of an M element cation to electronegativity of a Co element cation is 1.05 to 1.64.

7. The positive active material according to claim 1, wherein a concentration of the R element on a surface of the positive active material is higher than the concentration of the R element inside the positive active material, wherein the concentration of the R element is the ratio of $n_R$ to $n_{Co+M}$.

8. The positive active material according to claim 7, wherein a ratio of the concentration of the R element in a region from the surface of the positive active material to a depth of 50 nm to the concentration of the R element in other regions of the positive active material is (1 to 10):1.

9. The positive active material according to claim 8, wherein an R element concentration difference at any position in the other regions of the positive active material is less than 5%.

10. The positive active material according to claim 1, wherein the positive active material satisfies at least one of the following conditions:

d. the positive active material comprises pores and/or gaps;

e. an average particle diameter $D_{v50}$ of the positive active material is 10 µm to 25 µm; and f. a specific surface area of the positive active material is 0.1 m²/g to 3 m²/g.

11. An electrochemical device, comprising a positive active material layer, wherein the positive active material layer comprises a positive active material, wherein the positive active material comprises a lithium transition metal composite oxide containing Co and R elements and an M element; the lithium transition metal composite oxide has a $P6_3mc$ crystal structure; wherein the M element comprises at least one of Al, Mg, Ti, Mn, Fe, Ni, Zn, Cu, Nb, Cr, Y, or Zr; the R element comprises at least one of F or Cl; a molar content of the R element is $n_R$, a sum of a molar content of the Co element and a molar content of the M element is $n_{Co+M}$, and a ratio $\delta$ of $n_R$ to $n_{Co+M}$ is $0<\delta\leq0.01$.

12. The electrochemical device according to claim 11, wherein the positive active material satisfies at least one of the following conditions:

a. the positive active material further comprises a Li element, a molar content of the Li element is $n_{Li}$, and a ratio x of $n_{Li}$ to $n_{Co+M}$ is $0.6<x<0.95$;

b. the positive active material further comprises an Na element, a molar content of the Na element is $n_{Na}$, and a ratio z of $n_{Na}$ to $n_{Co+M}$ is $0<z<0.03$; and c. the molar content of the M element is $n_M$, a ratio y of $n_M$ to $n_{Co+M}$ is $0\leq y<0.15$, the molar content of the Co element is $n_{Co}$, and a ratio of $n_{Co}$ to $n_{Co+M}$ is 1-y.

13. The electrochemical device according to claim 12, wherein a chemical general formula of the positive active material is $Li_xNa_zCo_{1-y}M_yO_{2-\delta}R_\delta$, wherein $0.6<x<0.95$, $0\leq y<0.15$, $0\leq z<0.03$, and $0<\delta\leq0.01$.

14. The electrochemical device according to claim 11, wherein as analyzed using X-ray photoelectron spectroscopy, an XPS spectrum of the positive active material contains an O1s peak in a range of 530 eV to 535 eV.

15. The electrochemical device according to claim 11, wherein a ratio of electronegativity of an M element cation to electronegativity of a Co element cation is 1 to 2.

16. The electrochemical device according to claim 11, wherein a concentration of the R element on a surface of the positive active material is higher than the concentration of the R element inside the positive active material, wherein the concentration of the R element is the ratio of $n_R$ to $n_{Co+M}$.

17. The electrochemical device according to claim 16, wherein a ratio of the concentration of the R element in a region from the surface of the positive active material to a depth of 50 nm to the concentration of the R element in other regions of the positive active material is (1 to 10):1.

18. The electrochemical device according to claim 17, wherein an R element concentration difference at any position in the other regions of the positive active material is less than 5%.

19. The electrochemical device according to claim 11, wherein the positive active material satisfies at least one of the following conditions:

d. the positive active material comprises pores and/or gaps;

e. an average particle diameter $D_{v50}$ of the positive active material is 10 μm to 25 μm; and f. a specific surface area of the positive active material is 0.1 m²/g to 3 m²/g.

20. The electrochemical device according to claim 11, wherein when a capacity of the electrochemical device in a fully discharged state is not less than 180 mAh/g, as analyzed by using an X-ray diffraction method, a main peak in an XRD pattern of the positive active material falls within a range of 18° to 19°, and a peak width at half height of the main peak is 0° to 0.5°.

\* \* \* \* \*